US012498865B1

United States Patent
Shao

(10) Patent No.: US 12,498,865 B1
(45) Date of Patent: Dec. 16, 2025

(54) SYSTEMS AND METHODS FOR DATA MANAGEMENT BASED ON INDUSTRIAL INTERNET OF THINGS (IIoT) DATA CENTERS

(71) Applicant: CHENGDU QINCHUAN IOT TECHNOLOGY CO., LTD., Sichuan (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/173,788

(22) Filed: Apr. 8, 2025

(30) Foreign Application Priority Data

Mar. 20, 2025 (CN) .......................... 202510334385.3

(51) Int. Cl.
*G06F 3/00* (2006.01)
*G06F 3/06* (2006.01)
(Continued)

(52) U.S. Cl.
CPC .......... *G06F 3/0629* (2013.01); *G06F 3/0608* (2013.01); *G06F 3/067* (2013.01); *G16Y 40/35* (2020.01); *H04L 43/10* (2013.01)

(58) Field of Classification Search
None
See application file for complete search history.

(56) References Cited

U.S. PATENT DOCUMENTS 11,662,703 B1 * 5/2023 Shao ...................... H04L 67/12
700/79
2017/0364962 A1 12/2017 Wilkinson et al.
(Continued)

FOREIGN PATENT DOCUMENTS

AU 2019100888 A4 9/2019
CN 109062129 A 12/2018
(Continued)

OTHER PUBLICATIONS

Notification to Grant Patent Right for Invention in Chinese Application No. 202510334385.3 mailed on May 23, 2025, 5 pages.
(Continued)

*Primary Examiner* — Midys Rojas
(74) *Attorney, Agent, or Firm* — PORUS IP LLC

(57) ABSTRACT

Provide are a system and a method for data management based on an Industrial IIoT data center. The system includes an IIoT user platform, an IIoT service platform, an IIoT management platform, an IIoT sensor network platform, and an IIoT sensing and control platform. The IIoT management platform is configured to: determine a future acquisition parameter of a sensor network sub-platform based on a remaining storage space, a first retrieval feature, and a future retrieval feature; determine a pre-increment storage capacity based on the future acquisition parameter; determine a group to be deleted based on the pre-increment storage capacity, the remaining storage space, and a group retrieval feature and a group data volume corresponding to each of a plurality of data groups; generate a parameter update instruction based on the future acquisition parameter; and generate a data deletion instruction based on the group to be deleted.

10 Claims, 5 Drawing Sheets

(51) Int. Cl.
  *G16Y 40/35* (2020.01)
  *H04L 43/10* (2022.01)

(56) References Cited

U.S. PATENT DOCUMENTS

| | | | |
|---|---|---|---|
| 2020/0089214 A1 | 3/2020 | Cella | |
| 2023/0206356 A1* | 6/2023 | Shao | G06Q 10/06315 |
| | | | 705/7.25 |

FOREIGN PATENT DOCUMENTS

| | | |
|---|---|---|
| CN | 110073301 A | 7/2019 |
| CN | 112699117 A | 4/2021 |
| CN | 113765715 A | 12/2021 |
| CN | 117407445 A | 1/2024 |
| CN | 118394816 A | 7/2024 |
| CN | 118394977 A | 7/2024 |
| CN | 118534883 A | 8/2024 |
| CN | 119254603 A | 1/2025 |

OTHER PUBLICATIONS

First Office Action in Chinese Application No. 202510334385.3 mailed on Apr. 30, 2025, 12 pages.

Gu, Jirong et al., Technology of Distributed and Heterogeneous Cadastral Data Online Collection System, Computer Engineering and Design, 30(24): 5751-5754&5758, 2009.

Hao, Jialong, Analysis and Implementation of RealTime Historical Database of Configuration Software for Monitoring in Industry, Full-text Database of Excellent Master's Dissertations in China, 2010, 89 pages.

Liu, Qing et al., An Implementation of Power IoT Time Series Data Based on InfluxDB, 2023 International Conference on Advances in Electrical Engineering and Computer Applications (AEECA), 34-39, 2023.

\* cited by examiner

200

```
┌─────────────────────────────────────────────────────┐
│ Determining a future acquisition parameter of a     │  210
│ sensor network sub-platform based on a remaining    │
│ storage space, a first retrieval feature, and a     │
│ future retrieval feature of a sensor network sub-   │
│ database corresponding to the sensor network sub-   │
│ platform                                            │
└─────────────────────────────────────────────────────┘
                          │
                          ▼
┌─────────────────────────────────────────────────────┐
│ Determining a pre-increment storage capacity of the │  220
│ sensor network sub-database based on the future     │
│ acquisition parameter                               │
└─────────────────────────────────────────────────────┘
                          │
                          ▼
┌─────────────────────────────────────────────────────┐
│ Partitioning data items in the sensor network sub-  │  230
│ database to obtain a plurality of data groups       │
└─────────────────────────────────────────────────────┘
                          │
                          ▼
┌─────────────────────────────────────────────────────┐
│ Determining a group to be deleted based on the      │  240
│ pre-increment storage capacity, the remaining       │
│ storage space, and a group retrieval feature and a  │
│ group data volume corresponding to each of the      │
│ plurality of data groups                            │
└─────────────────────────────────────────────────────┘
                          │
                          ▼
┌─────────────────────────────────────────────────────┐
│ Generating a parameter update instruction based on  │  250
│ the future acquisition parameter, and sending the   │
│ parameter update instruction to the sensor network  │
│ sub-platform to control the sensor network sub-     │
│ platform to perform data acquisition based on the   │
│ future acquisition parameter                        │
└─────────────────────────────────────────────────────┘
                          │
                          ▼
┌─────────────────────────────────────────────────────┐
│ Generating a data deletion instruction based on the │  260
│ group to be deleted, and sending the data deletion  │
│ instruction to the sensor network sub-platform to   │
│ control the sensor network sub-platform to delete   │
│ the group to be deleted                             │
└─────────────────────────────────────────────────────┘
```

┌─────────────────────────────────────────────────────┐
│ Determining a plurality of associated platform groups and intra- │ 310
│ group association degree corresponding to each of the plurality of │
│ associated platform groups based on a second retrieval feature │
│ corresponding to each of a plurality of sensor network sub- │
│ platforms │
└─────────────────────────────────────────────────────┘
                            ↓
┌─────────────────────────────────────────────────────┐
│ Determining a plurality of associated sub-platforms based on the │ 320
│ plurality of associated platform groups │
└─────────────────────────────────────────────────────┘
                            ↓
┌─────────────────────────────────────────────────────┐
│ Determining a future retrieval feature based on an intra-group │ 330
│ association degree corresponding to each of the plurality of │
│ associated sub-platforms and first storage data │
└─────────────────────────────────────────────────────┘

FIG. 3

SYSTEMS AND METHODS FOR DATA MANAGEMENT BASED ON INDUSTRIAL INTERNET OF THINGS (IIoT) DATA CENTERS

CROSS-REFERENCE TO RELATED APPLICATIONS

This application claims priority to Chinese Patent Application No. 202510334385.3, filed on Mar. 20, 2025, the entire contents of which are hereby incorporated by reference.

TECHNICAL FIELD

The present disclosure relates to the field of data management, and in particular, to a system and a method for data management based on an Industrial Internet of Things (IIoT) data center.

BACKGROUND

With the deepening application of Industrial Internet of Things (IoT) technology, an enterprise-level sensor network platform has become the core support for industrial automation and intelligence. In the enterprise-level sensor network platform, a plurality of sub-databases are configured to provide a proprietary storage space for each of different business data, thereby ensuring flexibility and efficiency in data management. However, how to efficiently collect data and maintain a storage space for each sub-platform has become the key to improving overall system performance.

Therefore, a system and a method for data management based on an Industrial Internet of Things (IIoT) data center are provided, which are capable of improving the standardization and flexibility of data management and enhancing data management efficiency.

SUMMARY

One or more embodiments of the present disclosure provide a system for data management based on an Industrial Internet of Things (IIoT) data center. The system includes an IIoT user platform, an IIoT service platform, an IIoT management platform, an IIoT sensor network platform, and an IIoT sensing and control platform. The IIoT management platform includes an IIoT data center. The IIoT sensor network platform includes a plurality of sensor network sub-platforms and a plurality of sensor network sub-databases. Each of the plurality of sensor network sub-databases corresponding to one of the plurality of sensor network sub-platforms. The IIoT management platform is configured to: every first predetermined cycle, for a sensor network sub-platform of the plurality of sensor network sub-platforms: every first predetermined cycle, for a sensor network sub-platform among the plurality of sensor network sub-platforms: determine a future acquisition parameter of the sensor network sub-platform based on a remaining storage space, a first retrieval feature, and a future retrieval feature of the sensor network sub-database corresponding to the sensor network sub-platform; determine a pre-increment storage capacity of the sensor network sub-database based on the future acquisition parameter; partition data items in the sensor network sub-database to obtain a plurality of data groups; determine a group to be deleted based on the pre-increment storage capacity, the remaining storage space, and a group retrieval feature and a group data volume corresponding to each of the plurality of data groups; generate a parameter update instruction based on the future acquisition parameter, and send the parameter update instruction to the sensor network sub-platform to control the sensor network sub-platform to perform data acquisition based on the future acquisition parameter; and generate a data deletion instruction based on the group to be deleted, and send the data deletion instruction to the sensor network sub-platform to control the sensor network sub-platform to delete the group to be deleted.

One or more embodiments of the present disclosure provide a method for data management based on an Industrial Internet of Things (IIoT) data center. The method is performed by an IIoT management platform of a system for data management system based on the IIoT data center. The method includes: every first predetermined cycle, for a sensor network sub-platform of a plurality of sensor network sub-platforms: determining a future acquisition parameter of the sensor network sub-platform based on a remaining storage space, a first retrieval feature, and a future retrieval feature of a sensor network sub-database corresponding to the sensor network sub-platform; determining a pre-increment storage capacity of the sensor network sub-database based on the future acquisition parameter; partitioning data items in the sensor network sub-database to obtain a plurality of data groups; determining a group to be deleted based on the pre-increment storage capacity, the remaining storage space, and a group retrieval feature and a group data volume corresponding to each of the plurality of data groups; generating a parameter update instruction based on the future acquisition parameter, and send the parameter update instruction to the sensor network sub-platform to control the sensor network sub-platform to perform data acquisition based on the future acquisition parameter; and generating a data deletion instruction based on the group to be deleted, and send the data deletion instruction to the sensor network sub-platform to control the sensor network sub-platform to delete the group to be deleted.

One or more embodiments of the present disclosure provide a non-transitory computer-readable storage medium. The storage medium stores computer instructions, and when a computer reads the computer instructions in the storage medium, the computer implements the method for data management based on the Industrial Internet of Things (IIoT) data center described in the present disclosure.

BRIEF DESCRIPTION OF THE DRAWINGS

The present disclosure will be further illustrated by way of exemplary embodiments, which will be described in detail through the accompanying drawings. These embodiments are not limiting, and in these embodiments the same numbering indicates the same structure, wherein:

FIG. 2 is a flowchart of an exemplary process of a method for data management based on an Industrial Internet of Things (IIoT) data center according to some embodiments of the present disclosure;

FIG. 3 is a flowchart of an exemplary process for determining a future retrieval feature according to some embodiments of the present disclosure;

DETAILED DESCRIPTION

Figure 1:
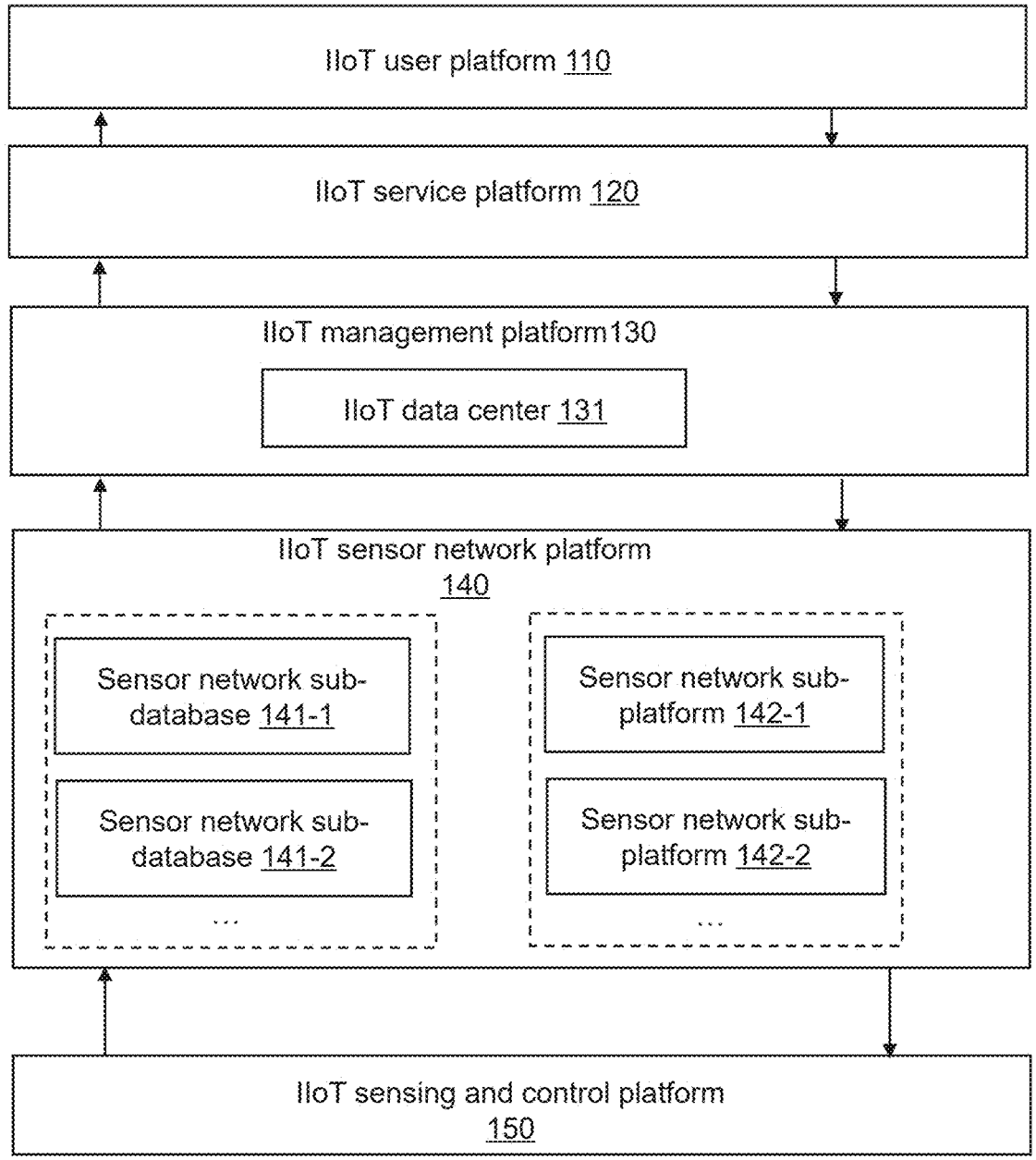
FIG. 1 is a block diagram of exemplary platforms of system for data management based on an Industrial Internet of Things (IIoT) data center according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or operations.

It should be understood that the terms "system," "device," "unit," and/or "module" used herein are ways for distinguishing different levels of components, elements, parts, or assemblies. However, if other terms can achieve the same purpose, they may be used as alternatives.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

FIG. 1 is a block diagram of exemplary platforms of system for data management based on an Industrial Internet of Things (IIoT) data center according to some embodiments of the present disclosure.

In some embodiments, a system 100 for data management based on an IIoT data center (hereinafter referred to as the system 100) includes an IIoT user platform 110, an IIoT service platform 120, an IIoT management platform 130, an IIoT sensor network platform 140, and an IIoT sensing and control platform 150.

The IIoT user platform 110 refers to a platform for interacting with a user. In some embodiments, the IIoT user platform may be configured as a terminal device. The terminal device includes a mobile device, a laptop, or the like.

The IIoT service platform 120 refers to a platform for providing IIoT-based data management services to the user. In some embodiments, the IIoT service platform is configured as a communication network, a server, etc. The IIoT service platform may interact with the IIoT management platform and the IIoT user platform.

The IIoT management platform 130 refers to an integrated management platform for various types of data. In some embodiments, the IIoT management platform is configured as a server. In some embodiments, the IIoT management platform may also include at least one of a processor and a storage device, etc.

In some embodiments, the IIoT management platform includes an IIoT data center 131. The IIoT data center 131 is configured to store at least one of information and data related to the system 100. In some embodiments, the IIoT data center is also referred to as the data center.

The IIoT sensor network platform 140 refers to a platform that integrates and manages sensing information. In some embodiments, the IIoT sensor network platform is configured as a communication network, a gateway, etc. The IIoT sensor network platform may interact with the IIoT management platform and the IIoT sensing and control platform.

In some embodiments, the IIoT sensor network platform includes a plurality of sensor network sub-databases (e.g., a sensor network sub-database 141-1, a sensor network sub-database 141-2, etc.) and a plurality of sensor network sub-platforms (e.g., a sensor network sub-platform 142-1, a sensor network sub-platform 142-2, etc.). A sensor network sub-database refers to a database that stores and manages sensing information acquired by the sensor network sub-platform. A count of the plurality of sensor network sub-databases is the same as a count of the plurality of sensor network sub-platforms, and each of the plurality of sensor network sub-databases corresponds to one of the plurality of sensor network sub-platforms.

The IIoT sensing and control platform 150 refers to a functional platform configured to generate sensing information and execute control information. In some embodiments, the IIoT sensing and control platform includes a plurality of types of manufacturing devices and sensors. For example, the manufacturing devices include an automated production device, a quality inspection device, or the like. The sensors include a pressure sensor, an image sensor, a temperature sensor, or the like.

A sensor network sub-platform refers to a platform that collects sensing information based on business requirements. For example, the business requirements include production monitoring, energy management, or the like. Accordingly, the sensor network sub-platform includes a production monitoring sub-platform, an energy management sub-platform, or the like. The production monitoring sub-platform refers to a platform for real-time monitoring of an operation status of a factory production line. The energy management sub-platform refers to a platform for collecting and analyzing data on energy consumption of a plant or a facility.

In some embodiments, the sensor network sub-platform collects sensing information corresponding to the business requirements through a plurality of sensing devices in the IIoT sensing and control platform, and uploads the sensing information to the IIoT management platform. The sensor network sub-platform stores the acquired sensing information in a corresponding sensor network sub-database.

In some embodiments, the IIoT management platform may retrieve data within the sensor network sub-database based on retrieval requirements and upload the data to the IIoT user platform via the IIoT service platform. The retrieval requirements refer to types of sensor network sub-databases that the user of the IIoT management platform wants to retrieve. The retrieval requirements correspond to the business requirements. For example, the retrieval requirements include retrieving data within the sensor network sub-database corresponding to the energy management sub-platform, etc.

It may be understood that a business requirement may require sensing information of a portion of the plurality of sensing devices. Therefore, the sensing information of the sensing devices related to the business requirement may be collected by the corresponding sensor network sub-platform. Moreover, if all data collected by the sensor network sub-platform were stored in the data center, it may create a significant load on the data center. By utilizing sensor network sub-databases to store data acquired by the corresponding sensor network sub-platforms, the system 100 can effectively reduce the load on the data center while maintaining clear segregation of data corresponding to different sensor network sub-platforms.

In some embodiments, the system 100 further includes a processor and a storage device. The processor is configured to process at least one of information and data related to the system 100. The processor includes a central processing unit (CPU), a specialized instruction processor (ASIP), a graphics processing unit (GPU), etc., or any combination thereof.

More descriptions regarding the foregoing may be found in FIG. 2 to FIG. 5 and relevant descriptions.

The system 100 established an operational information loop among various functional platforms. Under the unified management of the IIoT management platform, these platforms operate in a coordinated and regulated manner, thereby achieving information-based and intelligent data management.

FIG. 2 is a flowchart of an exemplary process of a method for data management based on an Industrial Internet of Things (IIoT) data center according to some embodiments of the present disclosure. As shown in FIG. 2, process 200 includes the following operations. In some embodiments, process 200 may be performed by an IIoT management platform (hereinafter referred to as the management platform) of a system for data management based on an IIoT data center.

In some embodiments, every first predetermined cycle, the management platform may perform operation 210 to operation 260 for a sensor network sub-platform of a plurality of sensor network sub-platforms to generate at least one of a parameter update instruction and a data deletion instruction. The first predetermined cycle is pre-set based on historical experience.

More descriptions regarding the system for data management based on an IIoT data center and the platforms of the system may be found in FIG. 1 and relevant descriptions thereof.

Operation 210, determining a future acquisition parameter of the sensor network sub-platform based on a remaining storage space, a first retrieval feature, and a future retrieval feature of a sensor network sub-database corresponding to the sensor network sub-platform.

The remaining storage space refers to a size of an available storage space in the sensor network sub-database. The size of the available storage space is expressed by an amount of data that may be stored. In some embodiments, the management platform obtains the remaining storage space from the sensor network sub-database.

The first retrieval feature refers to a retrieval pattern of the sensor network sub-database during a predetermined historical period. The retrieval feature refers to data that characterizes an access status of the sensor network sub-database. For example, the retrieval feature includes at least one of a count of retrievals of the sensor network sub-database, one or more data items obtained in each retrieval, and an average value of data volumes obtained from a plurality of retrievals. The count of retrievals of the sensor network sub-database refers to a count of instances where the sensor network sub-database is retrieved for data. The predetermined historical period refers to a past time period relative to a current time point. The predetermined historical period is pre-set based on historical experience. The data item refers to data of the sensor network sub-platform stored in the sensor network sub-database.

In some embodiments, the management platform obtains the first retrieval feature by analyzing a historical retrieval process of the sensor network sub-database during the predetermined historical period.

The future retrieval feature refers to a retrieval pattern of the sensor network sub-database in a predetermined future period. The predetermined future period is pre-set based on historical experience.

In some embodiments, the management platform determines the future retrieval feature in a plurality of manners. For example, the management platform obtains the future retrieval feature by manual input.

In some embodiments, the management platform may obtain a plurality of associated sub-platforms of the sensor network sub-platform, and determine the future retrieval feature based on first storage data corresponding to each of the plurality of associated sub-platforms.

An associated sub-platform refers to another sensor network sub-platform that is correlated with the current sensor network sub-platform.

In some embodiments, the management platform obtains the associated sub-platforms through a plurality of manners. For example, the management platform obtains the associated sub-platforms by manual input.

In some embodiments, the management platform may determine the plurality of associated sub-platforms based on a plurality of associated platform groups. More descriptions of the determination of the plurality of associated sub-platforms based on the plurality of associated platform groups may be found in FIG. 3 and its related descriptions.

The first storage data corresponding to an associated sub-platform refers to data associated with data storage of the sensor network sub-database corresponding to the associated sub-platform. In some embodiments, the first storage data corresponding to an associated sub-platform includes a historical storage sequence of the associated sub-platform, or the like. The historical storage sequence refers to a sequence composed of data storage rates of the sensor network sub-database corresponding to the associated sub-platform at a plurality of sampling points in the predetermined historical period. The plurality of sampling points are pre-set based on historical experience.

In some embodiments, the data storage rate is represented by an amount of data stored per unit of time.

In some embodiments, for an associated sub-platform among the plurality of associated sub-platforms, the management platform constructs a first target vector based on the first storage data of the sensor network sub-database corresponding to the associated sub-platform, matches the first target vector against a first vector database to obtain a plurality of first feature vectors that satisfy a first similarity condition, and determine an average value of labels of the plurality of first feature vectors as a candidate retrieval feature of the sensor network sub-database corresponding to the associated sub-platform. The first similarity condition includes that a similarity between the first feature vector and the first target vector is greater than a first similarity threshold. The first similarity threshold is set based on experience. The similarity between vectors is negatively correlated to a vector distance. The vector distance includes a Euclidean distance, etc.

In some embodiments, the first vector database is constructed based on historical data. For example, the management platform constructs the plurality of first feature vectors based on a plurality of pieces of historical first storage data of the sensor network sub-database corresponding to the associated sub-platform in a first historical period in the historical data. The management platform determines a plurality of actual feature vectors of the sensor network sub-database corresponding to the associated sub-platform at a second historical period as labels corresponding to the first feature vectors. The first historical period is earlier than the second historical period.

In some embodiments, the management platform determines candidate retrieval features of the sensor network sub-databases corresponding to the plurality of associated sub-platforms following the above manner. For each of the of the sensor network sub-databases, the management platform performs a weighted summation of counts of retrievals in the candidate retrieval feature, and designates a result of the weighted summation as the count of retrievals in the future retrieval feature of the sensor network sub-database corresponding to the sensor network sub-database. The management platform may designate retrieved data items in the candidate retrieval feature as the retrieved data items in the future retrieval feature, and determine a total data volume of the retrieved data items as a data volume of the retrieved data items in the future retrieval feature. Weights of different associated sub-platforms are set based on experience.

In some embodiments, the management platform determines the future retrieval feature based on an intra-group association degree corresponding to each of the plurality of associated sub-platforms and the first storage data. More descriptions may be found in FIG. 3 and related descriptions thereof.

The future retrieval feature of the current sensor network sub-platform can be more accurately determined by referencing the retrieval features of other sensor network sub-platforms (e.g., the associated sub-platforms) that have a high degree of correlation.

The future acquisition parameter refers to an acquisition parameter of the sensor network sub-platform in the predetermined future period. The acquisition parameter includes an acquisition frequency, an acquisition precision, etc. The acquisition accuracy refers to an accuracy of acquired sensing information. For example, the acquisition accuracy includes a pixel value of acquired image sensing information, etc.

In some embodiments, the management platform determines the future acquisition parameters in a plurality of manners. For example, the management platform constructs a to-be-clustered vector based on the remaining storage space, the first retrieval feature, and the future retrieval feature, and constructs clustering vectors based on historical remaining storage spaces, historical first retrieval features, and historical future retrieval features to construct clustering vectors. The management platform clusters the to-be-clustered vectors and a plurality of clustering vectors to obtain a plurality of clustering clusters, and determines a clustering cluster that includes the to-be-clustered vectors as a target cluster. The management platform selects, from future acquisition parameters corresponding to the clustering vectors in the target cluster, a future acquisition parameter with a best acquisition effect as the future acquisition parameter of the sensor network sub-platform. The acquisition effect is positively related to a retrieval success rate of the management platform in retrieving data items within the sensor network sub-platform after the sensor network sub-platform collects data based on the future acquisition parameter. The higher the retrieval success rate is, the better the acquisition effect is. The retrieval success rate refers to a ratio of a count of data items actually retrieved by the management platform from the sensor network sub-database to a count of data items that need to be retrieved. If the sensor network sub-database includes all data items that the management platform needs to retrieve, the retrieval success rate is 100%.

The future acquisition parameters corresponding to the clustering vectors may be predetermined based on historical data. For example, an actual acquisition parameter of the sensor network sub-platform corresponding to a clustering vector at a third historical period is determined as a future acquisition parameter of the sensor network sub-platform corresponding to a clustering vector at a fourth historical period. The third historical period is earlier than the fourth historical period.

Figure 4:
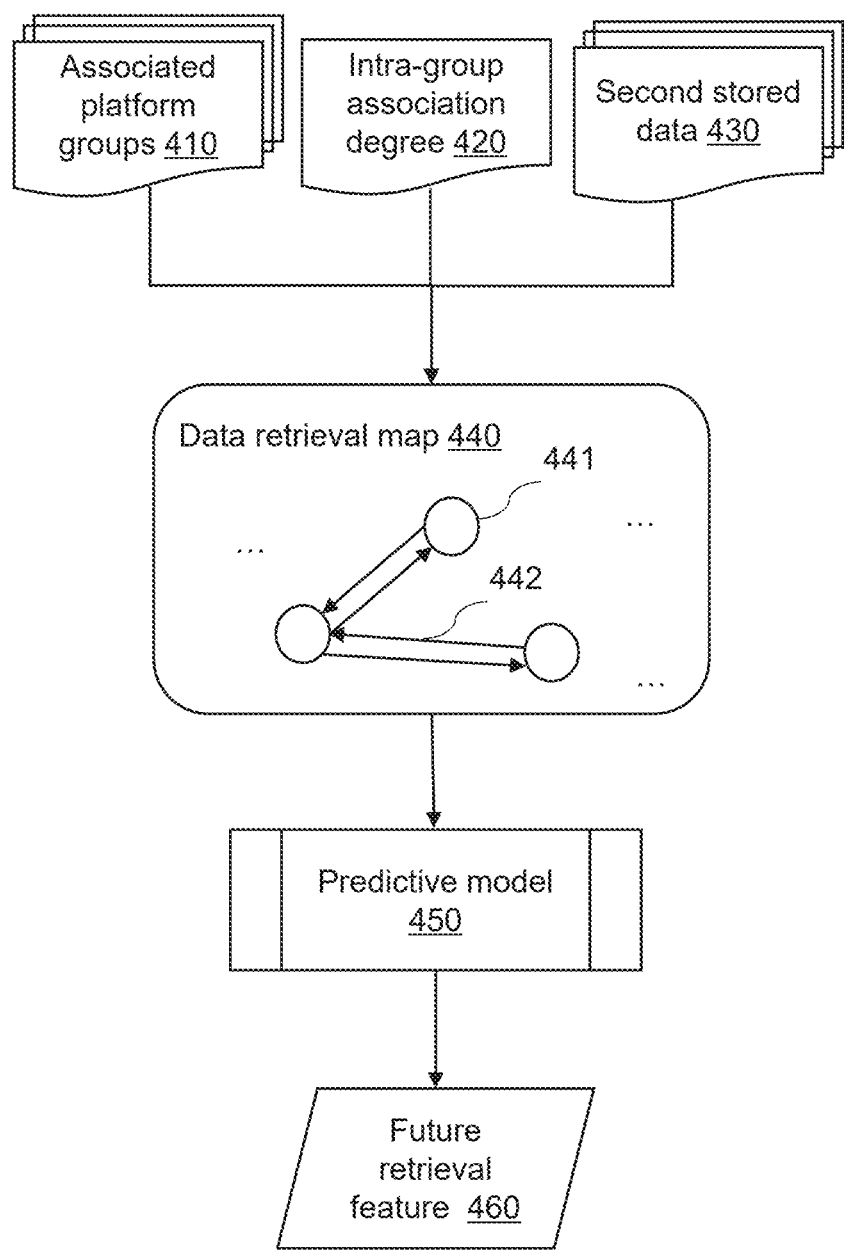
FIG. 4 is a schematic diagram of an exemplary predictive model according to some embodiments of the present disclosure.

In some embodiments, the management platform may adjust a future acquisition parameter of a target sub-platform based on future acquisition parameters of a plurality of associated sub-platforms corresponding to the target sub-platform, more descriptions may be found in FIG. 4 and relevant descriptions.

Operation 220, determining a pre-increment storage capacity of the sensor network sub-database based on the future acquisition parameter.

The pre-increment storage capacity refers to an increment data storage capacity that is added to the sensor network sub-database in the predetermined future period.

In some embodiments, the management platform determines the pre-increment storage capacity based on the future acquisition parameter of the sensor network sub-platform. For example, the management platform multiplies an acquisition frequency during the predetermined future period by a data volume acquired by a sensing device in a single acquisition, and designates a result of the multiplication as the pre-increment storage capacity. The data volume acquired by the sensing device at a single acquisition is a fixed amount.

In some embodiments, the management platform adjusts the pre-increment storage capacity based on an average value of first compression volumes and an average value of second compression volumes of the sensor network sub-database over a plurality of historical time intervals. For example, the management platform may designate a sum of the average value of the first compression volumes and the average value of the second compression volumes over the plurality of historical time intervals as a constant compression volume of the sensor network sub-database, and designate a difference between the pre-increment storage capacity and the constant compression volume as the final pre-increment storage capacity. The first compression volume refers to an amount of data reduced through deduplication compression performed by the sensor network sub-platform on the data collected by the sensing device. The second compression volume refers to an amount of data reduced through precision-based compression performed by the sensor network sub-platform on the data collected by the sensing device. The plurality of historical time intervals are set based on experience.

Operation 230, partitioning data items in the sensor network sub-database to obtain a plurality of data groups.

A data group refers to a group composed of a plurality of data items. In some embodiments, the management platform partitions the data items of the sensor network sub-database based on retrieval time sequences to obtain the plurality of data groups. For example, the management platform clusters a plurality of data items in the sensor network sub-database based on the retrieval time sequences corresponding to the plurality of data items, and determines a plurality of cluster clusters obtained after the clustering as the plurality of data groups. A retrieval time sequence corresponding to a data item refers to a sequence composed of time points when the data item was retrieved in historical data. The management platform determines a count of data items obtained in each retrieval in the first retrieval feature. For each of the data items, the management platform acquires time points at which the data item was retrieved based on the historical data, and composes the time points to obtain the retrieval time sequence corresponding to the data item.

Operation 240, determining a group to be deleted based on the pre-increment storage capacity, the remaining storage space, and a group retrieval feature and a group data volume corresponding to each of the plurality of data groups.

The group retrieval feature of a data group refers to a retrieval pattern of the data group at the predetermined future period. In some embodiments, the group retrieval feature includes at least one of a total retrieval count and a total retrieval volume of the plurality of data items within the data group over the predetermined future period, etc.

The group data volume of a data group refers to a total amount of the plurality of data items within the data group. The management platform determines a sum of data volumes of the plurality of data items within a data group as the group data volume of the data group.

In some embodiments, the management platform determines the group retrieval feature corresponding to each of the data groups based on the future retrieval feature. For example, the management platform determines a count of occurrences of the data items within the data group in the future retrieval feature, designates a product of the count of occurrences and a count of retrievals in the future retrieval feature as a total retrieval count in the group retrieval feature, and designates a product of a data volume of data items occurring in the future retrieval feature and the count of retrievals in the future retrieval feature as a total retrieval volume.

The group to be deleted refers to a data group that needs to be deleted. The group to be deleted includes one or more data groups.

In some embodiments, when the remaining storage space satisfies a predetermined deletion condition, the management platform iteratively includes a data group with a least total retrieval count into the group to be deleted based on the plurality of data groups, until a storage space of the sensor network sub-database after deleting the group to be deleted no longer satisfies the predetermined deletion condition, at which point the determination of the group to be deleted is completed. The predetermined deletion condition includes the storage space being less than the pre-increment storage capacity or a difference between the storage space and the pre-increment storage capacity being less than a storage capacity threshold. The storage capacity threshold is preset based on historical experience. The storage space of the sensor network sub-database after deletion of the group to be deleted is represented by a sum of the remaining storage space before iteration and the group data volume of the group to be deleted.

In some embodiments, the management platform may adjust the group to be deleted based on an estimated retrieval feature. More descriptions regarding the adjustment of the group to be deleted based on the estimated retrieval feature may be found in FIG. 5 and relevant descriptions thereof.

Operation 250, generating a parameter update instruction based on the future acquisition parameter, and sending the parameter update instruction to the sensor network sub-platform to control the sensor network sub-platform to perform data acquisition based on the future acquisition parameter.

The parameter update instruction refers to an instruction that controls the sensor network sub-platform to update the acquisition parameter. In some embodiments, the management platform converts the future acquisition parameter into a machine instruction, and sends the machine instruction to the sensor network sub-platform as the parameter update instruction to control the sensor network sub-platform to perform the data acquisition based on the future acquisition parameter.

Operation 260, generating a data deletion instruction based on the group to be deleted, and sending the data deletion instruction to the sensor network sub-platform to control the sensor network sub-platform to delete the group to be deleted.

The data deletion instruction refers to an instruction that controls the deletion of the group to be deleted by the sensor network sub-platform. In some embodiments, the management platform converts the group to be deleted into a machine instruction, and sends the machine instruction as the data deletion instruction to the sensor network sub-platform to control the sensor network sub-platform to delete the group to be deleted.

Generating the parameter update instruction based on the future acquisition parameter enables the control of the sensor network sub-platform to perform more comprehensive data acquisition, thereby enabling the retrieval of corresponding data items. Generating the data deletion instruction by identifying the group to be deleted enables timely deletion of infrequently used data, improves the standardization and flexibility of data management, and improves data management efficiency.

In some embodiments, every first predetermined cycle, the management platform may determine a heartbeat parameter between the sensor network sub-database and the IIoT data center based on the future acquisition parameter, determine a communication bandwidth between the sensor network sub-platform and the IIoT data center based on the heartbeat parameter, and adjust a communication parameter between the sensor network sub-platform and the IIoT data center based on the communication bandwidth.

In some embodiments, the heartbeat parameter includes a parameter related to data transmission between the sensor network sub-database and the IIoT data center. For example, the heartbeat parameter includes at least one of a heartbeat cycle and a type of heartbeat delivery information, etc.

The heartbeat cycle refers to a time interval during which the sensor network sub-database transmits the heartbeat delivery information to the IIoT data center.

The heartbeat delivery information refers to information related to data transmission between the sensor network sub-database and the IIoT data center. The type of the heartbeat delivery information includes at least one of status information, storage information, and a connection count, etc.

The status information is used to reflect a current status of the sensor network sub-database. For example, the status information includes whether the sensor network sub-database is available or faulty, or the like. The storage information includes a total data volume stored in the sensor network sub-database, the remaining storage space, or the like. The connection count refers to a count of IIoT data centers, sensor network sub-platforms, etc., connected to the sensor network sub-database.

In some embodiments, the management platform queries a predetermined table to identify a heartbeat parameter corresponding to the future acquisition parameter, and designates the heartbeat parameter as a current heartbeat parameter. The first predetermined table, constructed by a technician based on historical experience, includes a correspondence between future acquisition parameters and heartbeat parameters corresponding to the future acquisition parameters.

In some embodiments, every second predetermined cycle, in response to determining that load data of a communication link between the plurality of sensor network sub-platforms and the IIoT data center does not satisfy a predetermined load condition, the management platform adjusts the heartbeat parameter based on current storage data of the plurality of associated sub-platforms corresponding to the sensor network sub-platform.

In some embodiments, the management platform may adjust the heartbeat parameter between the sensor network sub-database corresponding to each of the plurality of sensor network sub-platforms and the IIoT data center based on the current storage data of the plurality of associated sub-platforms corresponding to the sensor network sub-platform. The following is an example of a single sensor network sub-platform.

The second predetermined cycle refers to a cycle during which the management platform adjusts the heartbeat parameter. The second predetermined cycle is set based on experience. The second predetermined cycle is shorter than the first predetermined cycle.

The load data refers to data traffic on the communication link between the IIoT data center and the plurality of sensor network sub-platforms. The plurality of sensor network sub-platforms share the same communication link to transmit information to the IIoT data center.

In some embodiments, the management platform obtains the load data by monitoring the data traffic on the communication link in real time.

The predetermined load condition refers to a condition for determining whether the heartbeat parameter needs to be adjusted. In some embodiments, the predetermined load condition includes the load data being less than a predetermined traffic threshold, etc. The predetermined traffic threshold is set based on experience.

The current storage data refers to data related to the data storage of the sensor network sub-database corresponding to the associated sub-platforms of the sensor network sub-platform at a current moment. In some embodiments, the current storage data includes a data storage rate of the sensor network sub-database at the current moment, or the like. More descriptions regarding the data storage rate may be found in operation 210 and relevant descriptions.

In some embodiments, the management platform determines a weighted sum of the current storage data of the plurality of associated sub-platforms corresponding to the sensor network sub-platform, and queries a heartbeat cycle adjustment amount and a type of heartbeat delivery information in a second predetermined table corresponding to the weighted sum based on the weighted sum. The management platform adjusts the heartbeat cycle based on the heartbeat cycle adjustment amount, and combines an adjusted heartbeat cycle with the type of heartbeat delivery information to form a new adjustment parameter. Weights of the associated sub-platforms are set based on experience.

The second predetermined table is constructed by a technician based on historical experience. The second predetermined table includes a plurality of weighted sums and heartbeat cycle adjustment amounts and types of heartbeat delivery information corresponding to the weighted sums.

When the load data exceeds the predetermined traffic threshold, the heartbeat parameter is adjusted based on the data storage rate of the sensor network sub-database at the current moment, so that the heartbeat parameter is adjusted in time to reduce data traffic on the communication link when a load on the communication link is large, thereby ensuring normal transmission of data in the communication link.

In some embodiments, the management platform allocates a communication bandwidth for each of the plurality of sensor network sub-platforms based on a heartbeat parameter ratio between the sensor network sub-database corresponding to the plurality of sensor network sub-platforms and the IIoT data center. For example, the management platform allocates a same proportion of communication bandwidth for each sensor network sub-platform as the heartbeat parameter ratio. The heartbeat parameter ratio is represented by the proportional value of a weighted sum of the heartbeat cycle and a data volume of the heartbeat delivery information. Weights of the heartbeat cycle and the data volume of the heartbeat delivery information are set based on experience. The weight of the heartbeat cycle may be negative.

The communication parameter refers to a parameter associated with communication between the sensor network sub-platform and the IIoT data center. In some embodiments, the communication parameter includes a routing parameter of a router on the communication link between the sensor network sub-platform and the IIoT data center, or the like. The routing parameter includes an IP address of the sensor network sub-platform, an IP address of the IIoT data center, a corresponding bandwidth limit, etc.

In some embodiments, the management platform designates the communication bandwidth corresponding to the sensor network sub-platform as the bandwidth limit in the routing parameter.

Adjusting the communication bandwidth based on the heartbeat parameter between the sensor network sub-database and the IIoT data center enables the allocation of an appropriate communication bandwidth to each sensor network sub-platform, thereby preventing inefficient data transmission due to insufficient bandwidth or resource wastage from excessive bandwidth allocation.

FIG. 3 is a flowchart of an exemplary process for determining a future retrieval feature according to some embodiments of the present disclosure. As shown in FIG. 3, process 300 includes the following operations.

Operation 310, determining a plurality of associated platform groups and intra-group association degrees corresponding to the plurality of associated platform groups based on a second retrieval feature corresponding to each of a plurality of sensor network sub-platforms.

The second retrieval feature corresponding to a sensor network sub-platform refers to data characterizing a retrieval time pattern of a sensor network sub-database corresponding to the sensor network sub-platform. In some embodiments, the second retrieval feature includes time points at which the sensor network sub-database was retrieved in historical data. The second retrieval feature is obtained based on the historical data.

An associated platform group refers to a combination of interconnected sensor network sub-platforms. Each of the plurality of associated platform groups includes two interrelated sensor network sub-platforms.

In some embodiments, the management platform determines, based on the second retrieval feature corresponding to each of the plurality of sensor network sub-platforms, an explicit correlation value and an implicit correlation value corresponding to any two of the plurality of sensor network sub-platforms. In response to a sum of the explicit correlation value and the implicit correlation value being greater than an association value threshold, the management platform determines the two sensor network sub-platforms as an associated platform group. The association value threshold is set based on experience.

The explicit correlation value is positively correlated with a count of occurrences of positive events over a plurality of historical time intervals. A positive event occurs when a count of concurrent retrievals of the two sensor network sub-databases corresponding to the two sensor network sub-platforms within one historical time interval is greater than a predetermined explicit threshold. The count of concurrent retrievals of the two sensor network sub-databases refers to a count of instances where the two sensor network sub-databases are retrieved simultaneously. The predetermined explicit threshold is set based on experience. The two sensor network sub-platforms being retrieved simultaneously refers to that a single retrieval instruction issued by the IIoT data center requires that data from the two sensor network sub-databases corresponding to two sensor network sub-platforms be retrieved simultaneously. More descriptions regarding the plurality of historical time intervals may be found in operation 220 and relevant descriptions.

In some embodiments, the predetermined explicit threshold may be positively correlated to an average count of sensor network sub-databases requested to be retrieved by a plurality of retrieval instructions.

The larger the average count of sensor network sub-databases requested to be retrieved by the plurality of retrieval instructions is, the weaker a correlation between the two simultaneously retrieved sensor network sub-platforms. In this case, the predetermined explicit threshold needs to be raised the predetermined explicit threshold to ensure the accuracy of the explicit correlation value.

The implicit correlation value is positively correlated with a count of occurrences of negative events over a plurality of historical time intervals. A negative event occurs when, within two or more consecutive historical time intervals, a count of standalone retrievals of the sensor network sub-database corresponding to each of the two sensor network sub-platforms is less than a predetermined implicit threshold. The count of standalone retrievals of a sensor network sub-database refers to a count of instances where the sensor network sub-database is retrieved independently. The predetermined implicit threshold is set based on experience.

In some embodiments, the predetermined implicit threshold may be positively correlated with a weighted sum of retrieval frequencies of the sensor network sub-databases corresponding to the two sensor network sub-platforms. The retrieved frequency of a sensor network sub-database refers to a ratio of an average value of counts of retrievals of the sensor network sub-database over the plurality of historical time intervals to a duration of a single historical time interval. Weights corresponding to the two sensor network sub-platforms are set based on experience.

If the retrieved frequency is small, it indicates that the sensor network sub-database is retrieved less often. Therefore, the predetermined implicit threshold may be appropriately lowered to prevent the count of standalone retrievals of each of the two sensor network sub-databases corresponding to the two sensor network sub-platforms from being persistently lower than the predetermined implicit threshold.

The intra-group association degrees corresponding to an associated platform group refer to a correlation level between two sensor network sub-platforms in the associated platform group. Each of the sensor network sub-platforms in the associated platform group corresponds to an intra-group association degree.

In some embodiments, based on the second retrieval feature corresponding to each of the plurality of sensor network sub-platforms, the management platform determines the counts of standalone retrievals and the counts of concurrent retrievals of the sensor network sub-databases corresponding to the two sensor network sub-platforms in the associated platform group. For the sensor network sub-databases corresponding to each of the two sensor network sub-platform, the management platform designates a ratio of the count of standalone retrievals and the count of concurrent retrievals of the sensor network sub-database as the intra-group association degree of the sensor network sub-platform corresponding to the sensor network sub-database.

Operation 320, determining a plurality of associated sub-platforms based on the plurality of associated platform groups.

In some embodiments, the two sensor network sub-platforms in each associated platform group are associated sub-platforms of each other. The management platform may identify all associated platform groups that include a current sensor network sub-platform and determine other sensor network sub-platforms in the associated platform groups as associated sub-platforms of the current sensor network sub-platform. More descriptions regarding the associated sub-platform may be found in FIG. 2 and relevant descriptions. The management platform may determine the associated sub-platforms of all sensor network sub-platforms in the manner described above.

Operation 330, determining the future retrieval feature based on the intra-group association degree corresponding to each of the plurality of associated sub-platforms and first storage data.

More descriptions regarding the future retrieval feature and the first storage data may be found in FIG. 2 and relevant descriptions In some embodiments, the management platform assigns weights to the plurality of associated sub-platforms for determining the future retrieval feature based on a proportional relationship between the intra-group association degrees corresponding to the plurality of associated sub-platforms of the current sensor network sub-platform. For example, the management platform assigns weights to the associated sub-platforms in a same proportion as the intra-group correlation degrees of the associated sub-platforms.

The management platform obtains the future retrieval feature of the sensor network sub-database corresponding to the current sensor network sub-platform by performing a weighted summation based on a plurality of candidate retrieval features of the sensor network sub-databases corresponding to the plurality of associated sub-platforms. More descriptions regarding obtaining the future retrieval feature by weighted summation based on the plurality of candidate retrieval features may be found in FIG. 4 and relevant descriptions thereof.

In some embodiments, the management platform constructs a data retrieval map based on the plurality of associated platform groups, the intra-group association degree corresponding to each of the plurality of sensor network sub-platforms, and second storage data corresponding to each of the plurality of sensor network sub-platforms. Then, the management platform determines the future retrieval feature through a predictive model based on the data retrieval map. More descriptions may be found in FIG. 4 and relevant descriptions thereof.

Based on historical retrieval patterns of the sensor network sub-database, it is possible to determine the plurality of associated platform groups corresponding to the sensor network sub-database and the intra-group association degrees of the associated platform groups. By accounting for varying influence levels of different associated sub-platforms and accordingly adjusting their respective weights, the obtained future retrieval feature of the sensor network sub-database corresponding to the sensor network sub-platform demonstrates enhanced accuracy.

FIG. 4 is a schematic diagram of an exemplary predictive model according to some embodiments of the present disclosure.

In some embodiments, as shown in FIG. 4, a management platform constructs a data retrieval map 440 based on a plurality of associated platform groups 410, an intra-group association degree 420 corresponding to each of a plurality of associated sub-platforms, and second storage data 430 corresponding to each of a plurality of sensor network sub-platforms. Based on the data retrieval map 440, the management platform determines a future retrieval feature 460 through a predictive model 450.

More descriptions regarding the associated platform groups, the intra-group association degree, and the future retrieval feature may be found in FIG. 4 and relevant descriptions thereof.

The second storage data corresponding to a sensor network sub-platform refers to data associated with data storage of the sensor network sub-database corresponding to the sensor network sub-platform. In some embodiments, the second storage data includes a historical storage sequence of the sensor network sub-database corresponding to the sensor network sub-platform, etc. More descriptions regarding the historical storage sequence may be found in operation 210 and relevant descriptions.

The data retrieval map refers to a graph structure that may reflect the retrieving data of the sensor network sub-databases corresponding to the plurality of sensor network sub-platforms. The graph structure is a data structure consisting of nodes and edges, wherein the edges connect the nodes, and the nodes and the edges may have features.

In some embodiments, the management platform constructs the data retrieval map 440 based on the plurality of associated platform groups 410, the intra-group association degree 420 corresponding to each of the plurality of associated sub-platforms, and the second storage data 430 corresponding to each of the plurality of sensor network sub-platforms. For example, a node (e.g., node 441, etc.) of the data retrieval map includes a sensor network sub-platform, and a node feature of the node includes the second storage data of the sensor network sub-database corresponding to the sensor network sub-platform.

The edges in the data retrieval map may represent an association relationship between the nodes. For example, if two sensor network sub-platforms belong to an associated platform group, two nodes corresponding to the two sensor network sub-platforms may be connected by two directed edges (e.g., edge 442, etc.) in opposite directions between the two sensor network sub-platforms. An edge feature of a directed edge includes the intra-group association degree of the sensor network sub-platform corresponding to a starting node of the directed edge.

The predictive model is a model for determining the future retrieval feature. In some embodiments, the predictive model is a machine learning model. For example, the predictive model may be a Graph Neural Network (GNN) model, a customized model structure, or the like, or any combination thereof.

In some embodiments, an input of the predictive model includes the data retrieval map. An output of the predictive model includes the future retrieval feature of the sensor network sub-database corresponding to each node in the data retrieval map.

In some embodiments, the management platform obtains the predictive model through training based on a plurality of labeled training samples. For example, the management platform may input the plurality of training samples into an initial predictive model, construct a loss function based on an output of the initial predictive model and the labels of the training samples, iteratively update parameters of the initial predictive model based on the loss function, and terminate the iterations when an iteration completion condition is satisfied to obtain a trained predictive model. The manners of iterative updating include, but are not limited to, a gradient descent manner, or the like. The iteration completion condition includes the loss function converging, a count of iterations reaching a threshold, etc.

Each of the training samples includes a sample data retrieval map. The sample data retrieval map includes a historical data retrieval map determined based on historical data in a fifth historical period. Nodes, node features, edges, and edge features of the historical data retrieval map are similar to those of the data retrieval map described above. The label of a training sample refers to an actual retrieval feature of each sample node in the sample data retrieval map in a sixth historical period. The sixth historical period is later than the fifth historical period.

Determining the future retrieval feature through the predictive model based on the data retrieval map enables simultaneous prediction of future retrieval features of the sensor network sub-databases corresponding to the plurality of sensor network sub-platforms, thereby achieving unified management of the sensor network sub-platforms. Determining the future retrieval feature by a machine learning model can improve the efficiency and accuracy in the determination of the future retrieval feature.

In some embodiments, the management platform determines an update priority corresponding to each of the plurality of sensor network sub-platforms through the data retrieval map, and determines a plurality of future acquisition parameters corresponding to the plurality of sensor network sub-platforms based on the update priority. In response to determining that the update priority of a target sub-platform satisfies a predetermined adjustment condition, the management platform may adjust a future acquisition parameter of the target sub-platform based on future acquisition parameters of a plurality of associated sub-platforms corresponding to the target sub-platform.

The update priority is used to adjust an order of future acquisition parameters. In some embodiments, the management platform sorts out-degrees of all nodes in the data retrieval map in descending order from largest to smallest, and designates sorting results (i.e., ranking positions) of the nodes as the update priorities of the sensor network sub-platforms corresponding to the nodes. The smaller the numeric value of a sorting result of a node is, the higher a ranking position of the node is, thus and the higher the update priority of the sensor network sub-platform corresponding to the node is. The out-degree of a node refers to a count of directed edges pointing from the node to other nodes.

In some embodiments, the management platform determines the sensor network sub-platform whose the update priority satisfies the predetermined adjustment condition as the target sub-platform, and adjusts the future acquisition parameter of the target sub-platform based on the future acquisition parameters of the plurality of associated sub-platforms corresponding to the target sub-platform. The predetermined adjustment condition may include the update priority being below a priority threshold. The priority threshold is set based on experience.

In some embodiments, the management platform filters associated platform groups that includes the target sub-platform, and designates a plurality of associated platform groups whose intra-group association degrees are greater than an association threshold as a plurality of target associated platform groups. In response to the future acquisition parameters of the sensor network sub-platforms other than the target sub-platform in the plurality of target associated platform groups satisfying a second predetermined condition, the management platform adjusts (e.g., reduce, etc.) the future acquisition parameter of the target sub-platform based on a predetermined adjustment amount. The association threshold and the predetermined adjustment amount are set based on experience.

The second predetermined condition includes a weighted sum of future acquisition parameters of the sensor network sub-platforms other than the target sub-platform being greater than a predetermined acquisition threshold. The predetermined acquisition threshold and weights of the sensor network sub-platforms other than the target sub-platform are set based on experience.

In some embodiments, the weights of the sensor network sub-platforms other than the target sub-platform are positively correlated to the intra-group association degrees corresponding to the sensor network sub-platforms in the associated platform groups including the target sub-platform.

Adjusting the future acquisition parameters of the sensor network sub-platforms based on the update priorities of the sensor network sub-platforms can prioritize the adjustment of the future acquisition parameter of the sensor network sub-platform with a relatively high degree of importance, and reduce the acquisition parameters of sensor network sub-platforms with relatively low priorities by the predetermined adjustment amount, thereby ensuring prioritized normal acquisition and transmission of data of the sensor network sub-platform with the relatively high degree of importance.

Figure 5:
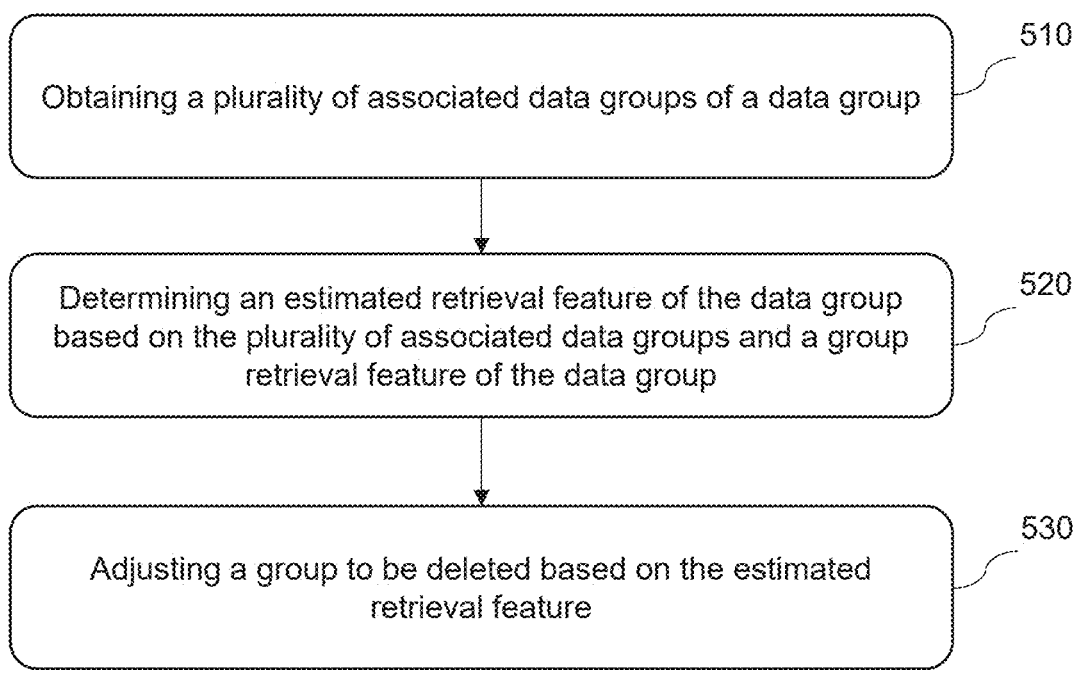
FIG. 5 is a flowchart of an exemplary process for adjusting a group to be deleted according to some embodiments of the present disclosure.

FIG. 5 is a flowchart of an exemplary process for adjusting a group to be deleted according to some embodiments of the present disclosure. As shown in FIG. 5, process 500 includes the following operations. Process 500 may be implemented by a management platform.

Operation 510, obtaining a plurality of associated data groups of a data group.

An associated data group refers to a data group that is associated with a current data group. In some embodiments, the management platform clusters the plurality of data groups based on time points when the plurality of data groups were retrieved in historical data and data items that were retrieved to obtain a plurality of clusters, and determines data groups that are in a same clusters with the current data group as the associated data groups of the current data group. More descriptions regarding the data group may be found in FIG. 2 and relevant descriptions thereof.

Operation 520, determining an estimated retrieval feature of the data group based on the plurality of associated data groups and a group retrieval feature of the data group.

More descriptions regarding the group retrieval feature may be found in FIG. 2 and relevant descriptions thereof.

The estimated retrieval feature refers to a group retrieval feature of the current data group in a predetermined future period.

In some embodiments, the management platform constructs feature vectors based on an associated data group among the plurality of associated data groups and the group retrieval feature of the data group, performs vector matching, and determines an average value of labels of the feature vectors obtained by the vector matching as a candidate retrieval feature of the associated data group. Based on candidate retrieval features corresponding to the plurality of associated data groups, the management platform determines a weighted sum of the plurality of candidate retrieval features as the estimated retrieval feature. Weights for the associated data groups are set based on experience. A manner for determining the candidate retrieval feature corresponding to the associated data group is similar to the manner for determining the candidate retrieval feature corresponding to the associated sub-platform in operation 210. More descriptions may be found in operation 210 and the related descriptions thereof.

Operation 530, adjusting the group to be deleted based on the estimated retrieval feature.

In some embodiments, after a group to be deleted is determined, if a difference between a storage space of a sensor network sub-database after deletion of the group to be deleted and a pre-increment storage capacity is higher than a storage space threshold, the management platform determines, among a plurality of groups to be deleted, a data group with a maximum weighted sum all parameters in the estimated retrieval feature of the data group as a data group that does not need to be deleted. The management platform iteratively performs the above operation until the difference between the storage space of the sensor network sub-database after deletion of the group to be deleted and the pre-increment storage capacity is not greater than the storage space threshold. The storage space threshold is set based on experience. More descriptions regarding the pre-increment storage capacity and the group to be deleted may be found in FIG. 4 and relevant descriptions thereof.

Based on the estimated retrieval feature, the group to be deleted can be adjusted in real-time. When the storage space of the sensor network sub-database after deletion of a group to be deleted still maintains an available capacity after accounting for the pre-increment storage capacity, data groups with a relatively high retrieval probability may be retained to maximize data integrity.

It should be noted that the foregoing descriptions of process 200, process 300, and process 500 are intended to be exemplary and illustrative only, and do not limit the scope of application of the present disclosure. For a person skilled in the art, various corrections and changes may be made to process 200, process 300, and process 500 under the guidance of the present disclosure. However, these corrections and changes remain within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for data management based on an Industrial Internet of Things (IIoT) data center, the system comprising an IIoT user platform, an IIoT service platform, an IIoT management platform, an IIoT sensor network platform, and an IIoT sensing and control platform; wherein
  the IIoT management platform includes the IIoT data center, the IIoT sensor network platform includes a plurality of sensor network sub-platforms and a plurality of sensor network sub-databases, each of the plurality of sensor network sub-databases corresponding to one of the plurality of sensor network sub-platforms,
  the IIoT management platform is configured to:
  every first predetermined cycle, for a sensor network sub-platform among the plurality of sensor network sub-platforms:
    determine a future acquisition parameter of the sensor network sub-platform based on a remaining storage space, a first retrieval feature, and a future retrieval feature of the sensor network sub-database corresponding to the sensor network sub-platform, wherein the first retrieval feature refers to a retrieval feature of the sensor network sub-database during a predetermined historical period, the future retrieval feature refers to a retrieval feature of the sensor network sub-database in a predetermined future period, and the retrieval feature refers to data that characterizes an access status of the sensor network sub-database;
    determine a pre-increment storage capacity of the sensor network sub-database based on the future acquisition parameter;
    partition data items in the sensor network sub-database to obtain a plurality of data groups;
    determine a group to be deleted based on the pre-increment storage capacity, the remaining storage space, and a group retrieval feature and a group data volume corresponding to each of the plurality of data groups;
    generate a parameter update instruction based on the future acquisition parameter, and send the parameter update instruction to the sensor network sub-platform to control the sensor network sub-platform to perform data acquisition based on the future acquisition parameter; and
    generate a data deletion instruction based on the group to be deleted, and send the data deletion instruction to the sensor network sub-platform to control the sensor network sub-platform to delete the group to be deleted.

2. The system of claim 1, wherein the IIoT management platform is further configured to:

obtain a plurality of associated sub-platforms of the sensor network sub-platform; and determine the future retrieval feature based on first storage data corresponding to each of the plurality of associated sub-platforms.

3. The system of claim 2, wherein the IIoT management platform is further configured to:

determine a plurality of associated platform groups and intra-group association degrees corresponding to the plurality of associated platform groups based on a second retrieval feature corresponding to each of the plurality of sensor network sub-platforms;

determine the plurality of associated sub-platforms based on the plurality of associated platform groups; and determine the future retrieval feature based on an intra-group association degree corresponding to each of the plurality of associated sub-platforms and the first storage data.

4. The system of claim 3, wherein the IIoT management platform is further configured to:

construct a data retrieval map based on the plurality of associated platform groups, the intra group association degree corresponding to each of the plurality of associated sub-platforms, and second storage data corresponding to each of the plurality of sensor network sub-platforms, the second storage data including the first storage data; and determine the future retrieval feature through a predictive model based on the data retrieval map, the predictive model being a machine learning model.

5. The system of claim 1, wherein the IIoT management platform is further configured to:

for a data group among the plurality of data groups:
obtain a plurality of associated data groups of the data group;
determine an estimated retrieval feature of the data group based on the plurality of associated data groups and a group retrieval feature of the data group; and
adjust the group to be deleted based on the estimated retrieval feature.

6. A method for data management based on an Industrial Internet of Things (IIoT) data center, the method being performed by an IIoT management platform of a system for data management system based on the IIoT data center, the method comprising;

every first predetermined cycle, for a sensor network sub-platform among a plurality of sensor network sub-platforms:
determining a future acquisition parameter of the sensor network sub-platform based on a remaining storage space, a first retrieval feature, and a future retrieval feature of a sensor network sub-database corresponding to the sensor network sub-platform, wherein the first retrieval feature refers to a retrieval feature of the sensor network sub-database during a predetermined historical period, the future retrieval feature refers to a retrieval feature of the sensor network sub-database in a predetermined future period, and the retrieval feature refers to data that characterizes an access status of the sensor network sub-database;
determining a pre-increment storage capacity of the sensor network sub-database based on the future acquisition parameter;

partitioning data items in the sensor network sub-database to obtain a plurality of data groups;

determining a group to be deleted based on the pre-increment storage capacity, the remaining storage space, and a group retrieval feature and a group data volume corresponding to each of the plurality of data groups;

generating a parameter update instruction based on the future acquisition parameter, and sending the parameter update instruction to the sensor network sub-platform to control the sensor network sub-platform to perform data acquisition based on the future acquisition parameter; and generating a data deletion instruction based on the group to be deleted, and sending the data deletion instruction to the sensor network sub-platform to control the sensor network sub-platform to delete the group to be deleted.

7. The method of claim 6, further comprising:
obtaining a plurality of associated sub-platforms of the sensor network sub-platform; and
determining the future retrieval feature based on first storage data corresponding to each of the plurality of associated sub-platforms.

8. The method of claim 7, wherein the determining the future retrieval feature based on first storage data corresponding to each of the plurality of associated sub-platforms includes:

determining a plurality of associated platform groups and intra-group association degrees corresponding to the plurality of associated platform groups based on a second retrieval feature corresponding to each of the plurality of sensor network sub-platforms;

determining the plurality of associated sub-platforms based on the plurality of associated platform groups; and determining the future retrieval feature based on an intra-group association degree corresponding to each of the plurality of associated sub-platforms and the first storage data.

9. The method of claim 8, further comprising:
constructing a data retrieval map based on the plurality of associated platform groups, the intra group association degree corresponding to each of the plurality of associated sub-platforms, and second storage data corresponding to each of the plurality of sensor network sub-platforms, the second storage data including the first storage data; and determining the future retrieval feature through a predictive model based on the data retrieval map, the predictive model being a machine learning model.

10. The method of claim 6, further comprising:
for a data group of the plurality of data groups:
obtaining a plurality of associated data groups of the data group;
determining an estimated retrieval feature of the data group based on the plurality of associated data groups and a group retrieval feature of the data group; and
adjusting the group to be deleted based on the estimated retrieval feature.

* * * * *